(12) United States Patent
    Carr

(10) Patent No.: US 12,686,063 B1
(45) Date of Patent: Jul. 21, 2026

(54) CORDLESS DRILL HAVING ROTATING MAGAZINE FOR BITS

(71) Applicant: Dave Carr, Mississauga (CA)

(72) Inventor: Dave Carr, Mississauga (CA)

( * ) Notice: Subject to any disclaimer, the term of this patent is extended or adjusted under 35 U.S.C. 154(b) by 435 days.

(21) Appl. No.: 18/376,013

(22) Filed: Oct. 3, 2023

(51) Int. Cl.
    B23B 45/02 (2006.01)
    B25F 5/00 (2006.01)

(52) U.S. Cl.
    CPC .............. B23B 45/02 (2013.01); B25F 5/008 (2013.01)

(58) Field of Classification Search
    CPC ................................. B23B 45/02; B25F 5/008
    See application file for complete search history.

(56) References Cited

U.S. PATENT DOCUMENTS

| | | | |
|---|---|---|---|
| 4,604,005 A | 8/1986 | Russ | |
| 4,730,134 A * | 3/1988 | Sistare | B23B 45/001 |
| | | | 310/91 |

| | | | |
|---|---|---|---|
| 5,065,498 A | 11/1991 | McKenzie | |
| 5,346,453 A | 9/1994 | Rivera-Bottzeck | |
| 6,007,277 A | 12/1999 | Olson | |
| D608,173 S | 1/2010 | Francis | |
| 8,007,424 B2 | 8/2011 | Moser | |
| 9,242,326 B2 | 1/2016 | Nagy | |

FOREIGN PATENT DOCUMENTS

| | | |
|---|---|---|
| WO | 199834746 | 8/1998 |

* cited by examiner

*Primary Examiner* — Moshe Wilensky
(74) *Attorney, Agent, or Firm* — Kyle A. Fletcher, Esq.

(57) ABSTRACT

The cordless drill having rotating magazine for bits includes a drill body, a drill chuck, an electric motor, a trigger switch, a magazine, a mechanical drive bypass, and a battery pack. A linear actuator within the magazine may deploy a first bit selected from a set of bits stored within the magazine by pushing the first bit forward into the drill chuck. The first bit may be rotated by the electric motor in order to drill a hole. The mechanical drive bypass may transfer the rotational motion of the electric motor around the magazine to the drill chuck. The linear actuator may retract the first bit, the magazine may be rotated, and a second bit may be deployed.

18 Claims, 4 Drawing Sheets

CORDLESS DRILL HAVING ROTATING MAGAZINE FOR BITS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cordless drills, more specifically, a cordless drill having rotating magazine for bits.

SUMMARY OF INVENTION

The cordless drill having rotating magazine for bits comprises a drill body, a drill chuck, an electric motor, a trigger switch, a magazine, a mechanical drive bypass, and a battery pack. A linear actuator within the magazine may deploy a first bit selected from a set of bits stored within the magazine by pushing the first bit forward into the drill chuck. The first bit may be rotated by the electric motor in order to drill a hole. The mechanical drive bypass may transfer the rotational motion of the electric motor around the magazine to the drill chuck. The linear actuator may retract the first bit, the magazine may be rotated, and a second bit may be deployed.

An object of the invention is to provide a cordless drill and a set of bits.

Another object of the invention is to provide a magazine for storing the set of bits.

A further object of the invention is to provide linear actuators to move an individual bit selected from the set of bits into and out of a chuck located at the front of the drill.

Yet another object of the invention is to provide a direction control button, a bit control button, and a trigger switch to operate the drill.

These together with additional objects, features and advantages of the cordless drill having rotating magazine for bits will be readily apparent to those of ordinary skill in the art upon reading the following detailed description of the presently preferred, but nonetheless illustrative, embodiments when taken in conjunction with the accompanying drawings.

In this respect, before explaining the current embodiments of the cordless drill having rotating magazine for bits in detail, it is to be understood that the cordless drill having rotating magazine for bits is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cordless drill having rotating magazine for bits.

It is therefore important that the claims be regarded as including such equivalent construction insofar as they do not depart from the spirit and scope of the cordless drill having rotating magazine for bits. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
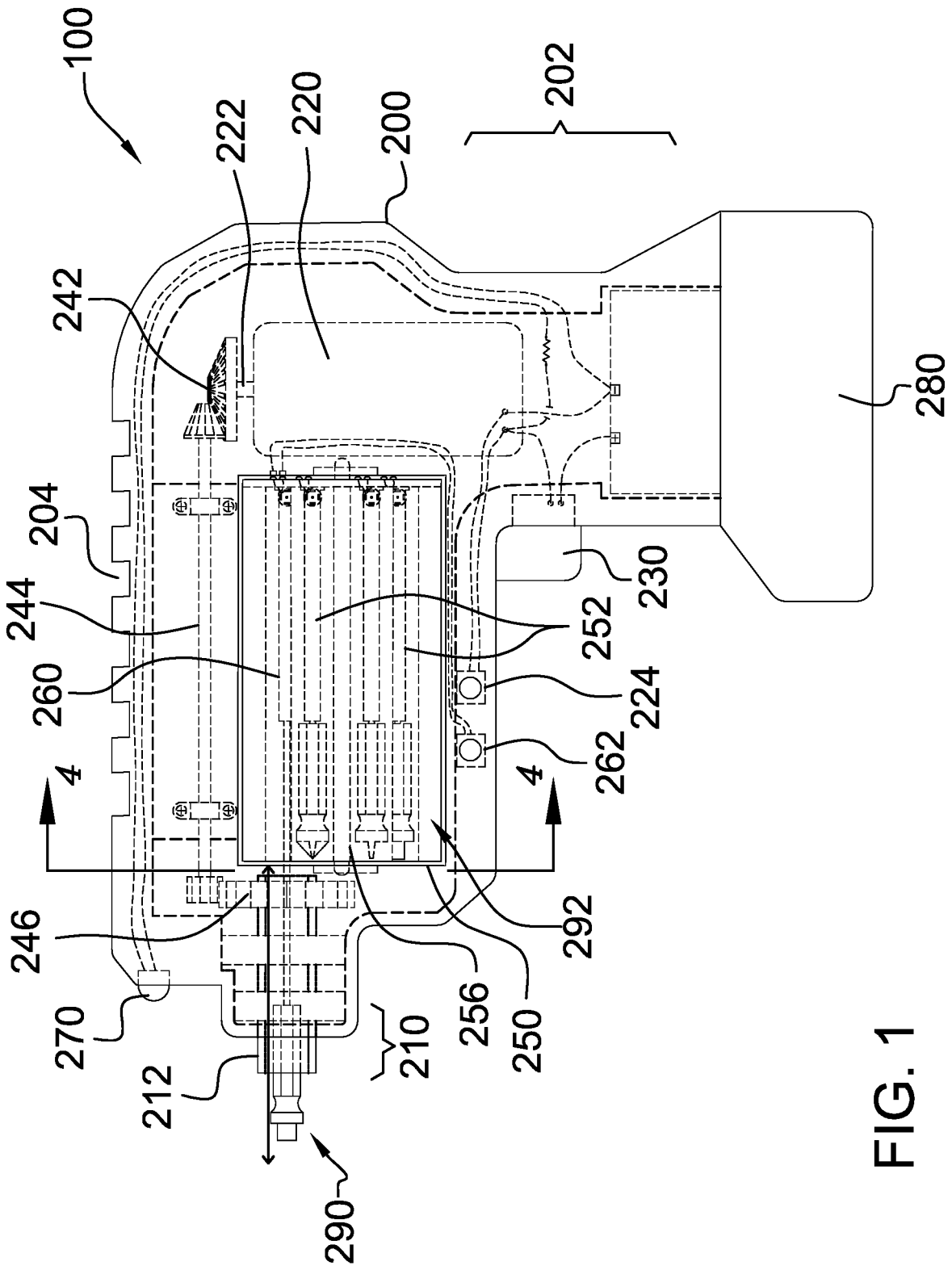
FIG. 1 is a side view of an embodiment of the disclosure.
Figure 2:
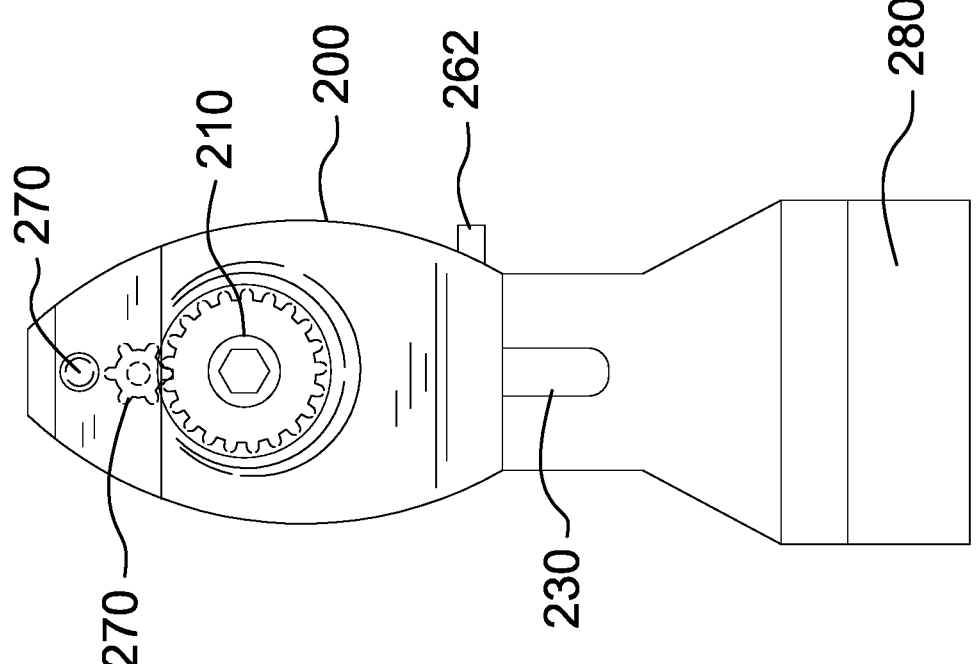
FIG. 2 is a front view of an embodiment of the disclosure.
Figure 3:
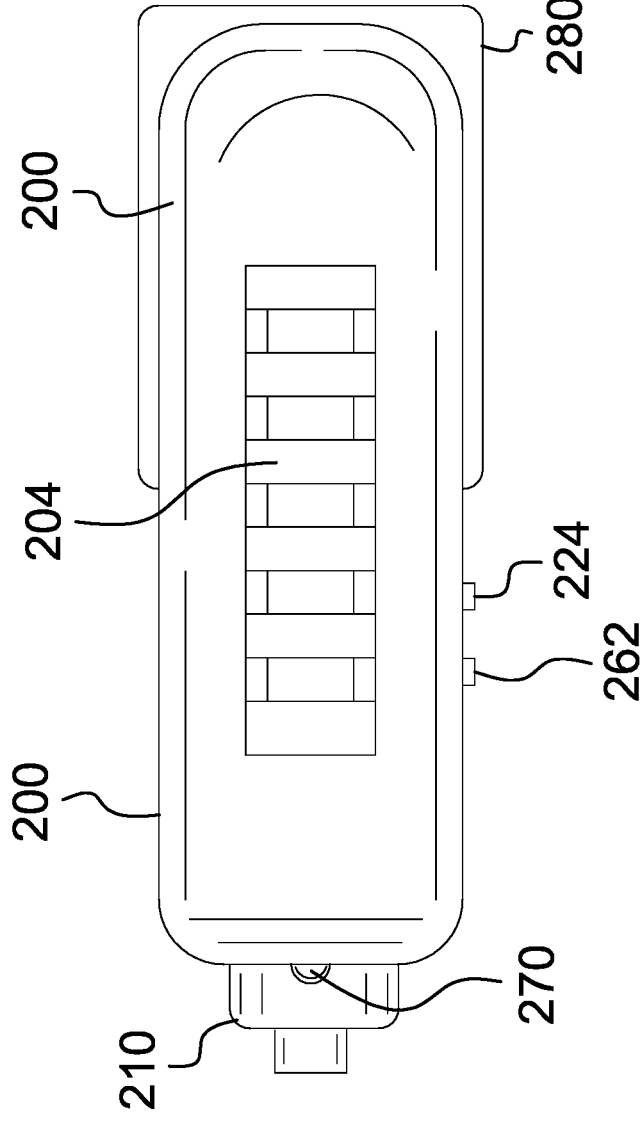
FIG. 3 is a top view of an embodiment of the disclosure.
Figure 4:
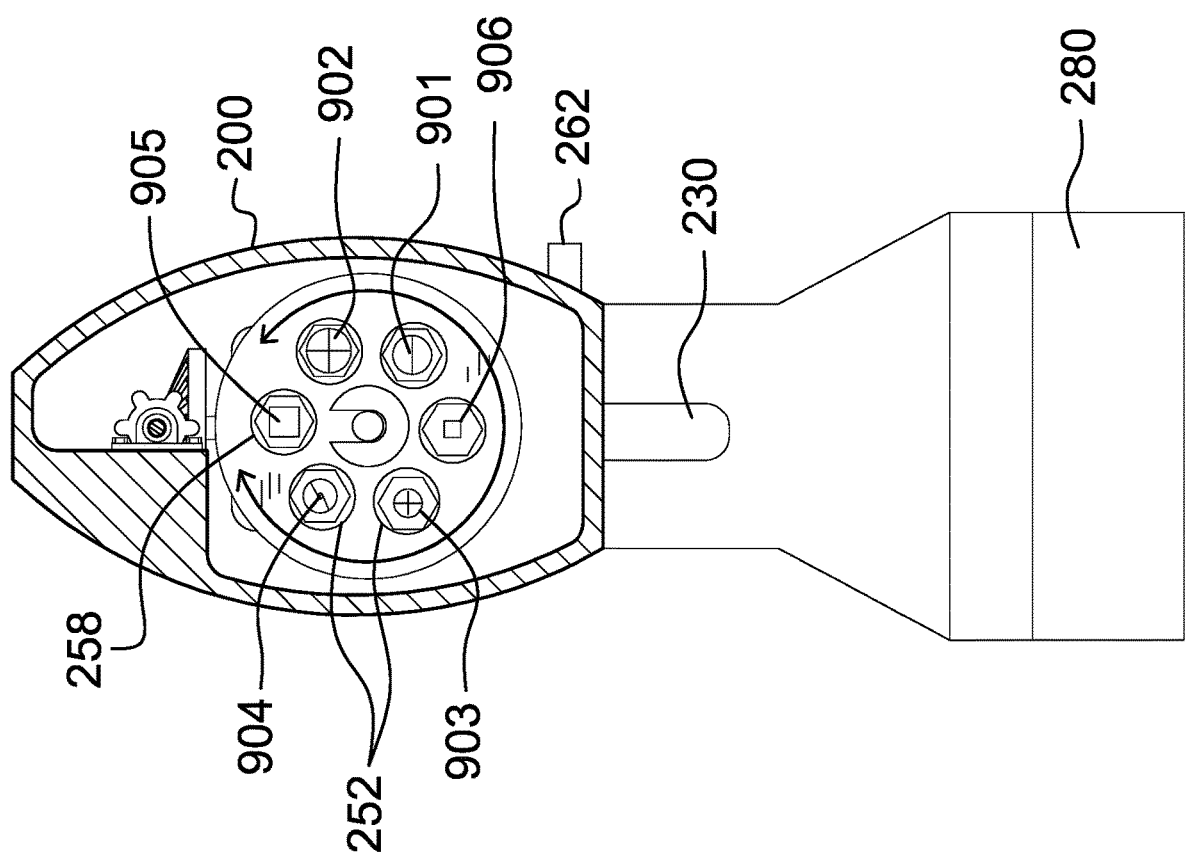
FIG. 4 is a cross-sectional view of an embodiment of the disclosure across 4-4 as shown in FIG. 1.

Detailed reference will now be made to a first potential embodiment of the disclosure, which is illustrated in FIGS. 1 through 4.

The cordless drill having rotating magazine for bits 100 (hereinafter invention) comprises a drill body 200, a drill chuck 210, an electric motor 220, a trigger switch 230, a magazine 250, a mechanical drive bypass, and a battery pack 280. A linear actuator 260 within the magazine 250 may deploy a first bit selected from a set of bits stored within the magazine 250 by pushing the first bit forward into the drill chuck 210. The first bit may be rotated by the electric motor 220 in order to drill a hole. The mechanical drive bypass may transfer the rotational motion of the electric motor 220 around the magazine 250 to the drill chuck 210. The linear actuator 260 may retract the first bit, the magazine 250 may be rotated, and a second bit may be deployed.

The drill body 200 may be a pistol grip enclosure for the magazine 250, the electric motor 220, the trigger switch 230, and the mechanical drive bypass. The drill body 200 may comprise a handle 202 that may extend downward from the rear of the drill body 200. The handle 202 may be adapted for a user to grasp while using the invention 100. The trigger switch 230 may be coupled to the top, front of the handle 202 where the trigger switch 230 is adapted to be accessible by the user. In some embodiments, the drill body 200 may comprise one or more cooling vents 204 to provide air circulation for cooling the electric motor 220.

The drill chuck 210 may be rotationally coupled to the front of the drill body 200. The drill chuck 210 may be tightened to retain an individual bit for drilling by turning an outer ring 212 in a tightening rotational direction with respect to the individual bit. The drill chuck 210 may be loosened to remove the individual bit from the drill chuck 210 by turning the outer ring 212 in a loosening rotational direction with respect to the individual bit.

The electric motor 220 may convert electrical energy into mechanical energy. The electric motor 220 may cause rotational motion of a motor shaft 222 when the electrical energy is applied to the electric motor 220. The electrical energy applied to the electric motor 220 may be controlled by the trigger switch 230 and a direction control button 224. The trigger switch 230 may apply the electrical energy to the electric motor when the trigger switch 230 is actuated and may remove the electrical energy when the trigger switch 230 is released.

The direction control button 224 may determine the polarity of the electrical energy applied to the electric motor 220 and, therefore, the rotational direction of the electric motor 220 and the individual bit. The direction control button 224 may be moved to a clockwise position in order to rotate the individual bit in a clockwise direction. The direction control button 224 may be moved to a counter-clockwise position in order to rotate the individual bit in a counter-clockwise direction.

The magazine 250 may be a rotating cylinder comprising a plurality of bit chambers 252 for storing the set of bits. An individual bit chamber selected from the plurality of bit chambers 252 may store a single bit. The magazine 250 may rotate on a spindle 256 that may be oriented front-to-rear and centered within the magazine 250. The plurality of bit chambers 252 may be equally spaced around the spindle 256. In a preferred embodiment, the magazine 250 may comprise six bit chambers. As a non-limiting example, the set of bits may comprise a slotted screw bit 901, a large crosshead screw bit 902, a small crosshead screw bit 903, a counter sink bit 904, a large square bit 905, and a small square bit 906 all stored within the magazine 250 simultaneously.

The individual bit chamber may be a hollow cylindrical cavity that may be oriented to be parallel to the spindle 256. The front of the individual bit chamber may be open such that the individual bit may slide into and out of the individual bit chamber via the front of the individual bit chamber. Each of the individual bit chambers may comprise the linear actuators 260. The linear actuators 260 may be operable to move the individual bits forward and rearward.

The magazine 250 may be rotated manually. As the magazine 250 rotates, the individual bit chamber that is positioned at the top of the magazine 250 may align with the drill chuck 210 such that the individual bit stored within the top chamber 258 may be deployed to the drill chuck 210 and retracted into the top chamber 258 by the linear actuator 260. As non-limiting examples, the linear actuator 260 may push the first bit forward out of the top chamber 258 to a bit extended position 290 where the drill chuck 210 may be tightened around the first bit such that rotation of the electric motor 220 may rotate the first bit and the linear actuator 260 may pull the first bit rearward to a bit retracted position 292 within the top chamber 258 such that the magazine 250 may be rotated to select the second bit. In some embodiments, detents in the mechanism may be operable to stop rotation of the magazine 250 at positions where the individual bit chambers align with the drill chuck 210 unless an external force is applied to continue rotation of the magazine 250

The linear actuator 260 may be an electromechanical device that may move the individual bit forward and rearward when energized by the battery pack 280. As a non-limiting example, the linear actuator 260 may be a hollow cylindrical telescoping tube such that the individual bit locates within the linear actuator 260 may be moved by the linear actuator 260. The linear actuator 260 may be energized by the battery pack 280 via a bit control button 262. The bit control button 262 may be adapted to be actuated by the user in order to energize the linear actuator 260 to deploy or retract the individual bit located in the top chamber 258.

As a non-limiting example, in some embodiments a first actuation of the bit control button 262 may deploy the individual bit at the top chamber 258 position to the bit extended position 290 and a second actuation of the bit control button 262 may retract the individual bit to the bit retracted position 292. As a further non-limiting example, in some embodiments actuating the bit control button 262 from the left side of the drill body 200 may deploy the individual bit to the bit extended position 290 and actuating the bit control button 262 from the right side of the drill body 200 may retract the individual bit to the bit retracted position 292, or vice versa.

The mechanical drive bypass may transfer the rotational motion of the motor shaft 222 to the drill chuck 210 using a mechanical drivetrain that avoids mechanical interference with the magazine 250. The mechanical drive bypass may comprise a bypass shaft 244, a first gearset 242, and a second gearset 246.

The bypass shaft 244 may be oriented to front-to-rear and parallel to the magazine 250. As a non-limiting example, the bypass shaft 244 may be supported by one or more bearings located within the drill body 200. The first gearset 242 may rotationally couple the electric motor 220 to the bypass shaft such that the bypass shaft 244 rotates whenever the electric motor 220 rotates. The second gearset 246 may rotationally couple the bypass shaft 244 to the drill chuck 210 such that the individual bit held by the drill chuck 210 may rotate whenever the bypass shaft 244 rotates. In some embodiments, the motor shaft 222 may be perpendicular to the bypass shaft 244 and the first gearset 242 may change the direction of the rotation by 90 degrees.

The battery pack 280 may comprise one or more energy-storage devices. The battery pack 280 may be a source of electrical energy to operate the electric motor 220 and the linear actuators 260. The battery pack 280 may be rechargeable and replaceable. The battery pack 280 may detachably couple to the bottom of the handle 202.

The invention 100 may further comprise a white led light 270 located at the front of the drill body 200 above the drill chuck 210. The white led light 270 may be configured to shine on the work that is being drilled. The white led light 270 may be energized by the trigger switch 230 such that the white led light 270 is on whenever the electric motor 220 is rotating. In some embodiments, a dropping resistor wired in series with the white led light 270 may limit the current flowing through the white led light 270 to prevent a failure of the white led light 270.

In use, a set of bits may be loaded into the magazine 250 by repeatedly placing an individual bit into the drill chuck 210, actuating the bit control button 262, and rotating the magazine 250. With the set of bits loaded, the user may rotate the magazine 250 until a desired bit is in the top chamber 258, actuate the bit control button 262 to deploy the desired bit, tighten the drill chuck 210 to retain the desired bit, and pull the trigger switch 230 to drill with the desired bit. To change from a first bit to a second bit, the user may loosen the drill chuck 210, actuate the bit control button 262 to retract the first bit, rotate the magazine 250 to move the second bit to the top chamber 258, and actuate the bit control button 262 to deploy the second bit. The drill chuck 210 may then be tightened and a hole may be drilled using the second bit.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "cavity" may be an empty space or negative space that is formed within an object.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "deploy" may refer to configuring a device to place the device into service or to make the device ready for service. As non-limiting examples, "deployed" may be synonymous with extended, unfolded, inflated, erected, or activated. As non-limiting examples, a device that is not deployed may be referred to as retracted, folded, deflated, withdrawn, collapsed, stowed, or deactivated.

As used herein, the word "desired" may refer to a specific value or action within a range of supported values or action. A "desired" value or action may indicate that a range of values or actions is enabled by the invention and that a user of the invention may select a specific value or action within the supported range of values or actions based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, an "electric motor" may be a device that converts electric energy into rotational mechanical energy.

As used herein, "energize" and/or "energization" may refer to the application of an electrical potential to a system or subsystem. "De-energize" and/or "de-energization" may refer to the removal of the electrical potential.

As used herein, "front" may indicate the side of an object that is closest to a forward direction of travel under normal use of the object or the side or part of an object that normally presents itself to view or that is normally used first. "Rear" or "back" may refer to the side that is opposite the front. As used herein, "handle" may refer to an object or aperture by which a tool, object, or door is held or manipulated with the hand.

As used in this disclosure, an "LED" may be an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used herein, a "linear actuator" may be a device that produces linear motion. The device may be electromechanical, hydraulic, or pneumatic in nature. Upon activation by an electrical potential or by a change in fluid or air pressure, the overall length of the device may change-either by lengthening or shortening.

As used in this disclosure, a "switch" may be an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used in this disclosure, "telescopic", "telescoping", and "telescopically" may refer to an object made of two or more sections that fit or slide into each other such that the object can be made longer or shorter by adjusting the relative positions of the sections.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cordless drill having rotating magazine for bits comprising:
   a drill body, a drill chuck, an electric motor, a trigger switch, a magazine, a mechanical drive bypass, and a battery pack;
   wherein a linear actuator within the magazine deploys a first bit selected from a set of bits stored within the magazine by pushing the first bit forward into the drill chuck;
   wherein the first bit is rotated by the electric motor in order to drill a hole;
   wherein the mechanical drive bypass transfers the rotational motion of the electric motor around the magazine to the drill chuck;
   wherein the linear actuator retracts the first bit, the magazine is rotated, and a second bit is deployed;
   wherein the magazine is a rotating cylinder comprising a plurality of bit chambers for storing the set of bits;
   wherein the individual bit chamber is a hollow cylindrical cavity that is oriented to be parallel to a spindle;
   wherein a front of the individual bit chamber is open such that an individual bit slides into and out of the individual bit chamber via the front of the individual bit chamber;
   wherein each of the individual bit chambers comprise the linear actuators;
   wherein the linear actuators are operable to move the individual bits forward and rearward.

2. The cordless drill having rotating magazine for bits according to claim 1
   wherein the drill body is a pistol grip enclosure for the magazine, the electric motor, the trigger switch, and the mechanical drive bypass;
   wherein the drill body comprises a handle that extends downward from the rear of the drill body;
   wherein the handle is adapted for a user to grasp while using the cordless drill having rotating magazine for bits;
   wherein the trigger switch is coupled to the top, front of the handle where the trigger switch is adapted to be accessible by the user.

3. The cordless drill having rotating magazine for bits according to claim 2
   wherein the drill body comprises one or more cooling vents to provide air circulation for cooling the electric motor.

4. The cordless drill having rotating magazine for bits according to claim 2
   wherein the drill chuck is rotationally coupled to the front of the drill body;
   wherein the drill chuck is tightened to retain the individual bit for drilling by turning an outer ring in a tightening rotational direction with respect to the individual bit;

wherein the drill chuck is loosened to remove the individual bit from the drill chuck by turning the outer ring in a loosening rotational direction with respect to the individual bit.

5. The cordless drill having rotating magazine for bits according to claim 4
   wherein the electric motor converts electrical energy into mechanical energy;
   wherein the electric motor causes rotational motion of a motor shaft when the electrical energy is applied to the electric motor;
   wherein the electrical energy applied to the electric motor is controlled by the trigger switch and a direction control button;
   wherein the trigger switch applies the electrical energy to the electric motor when the trigger switch is actuated and removes the electrical energy when the trigger switch is released.

6. The cordless drill having rotating magazine for bits according to claim 5
   wherein the direction control button determines the polarity of the electrical energy applied to the electric motor and the rotational direction of the electric motor and the individual bit;
   wherein the direction control button is moved to a clockwise position in order to rotate the individual bit in a clockwise direction;
   wherein the direction control button is moved to a counter-clockwise position in order to rotate the individual bit in a counter-clockwise direction.

7. The cordless drill having rotating magazine for bits according to claim 6
   wherein an individual bit chamber selected from the plurality of bit chambers stores a single bit;
   wherein the magazine rotates on the spindle that is oriented front-to-rear and centered within the magazine;
   wherein the plurality of bit chambers are equally spaced around the spindle.

8. The cordless drill having rotating magazine for bits according to claim 7 wherein the magazine comprises six bit chambers.

9. The cordless drill having rotating magazine for bits according to claim 7
   wherein the magazine is rotated manually;
   wherein as the magazine rotates, the individual bit chamber that is positioned at the top of the magazine aligns with the drill chuck such that the individual bit stored within the top chamber is deployed to the drill chuck and retracted into the top chamber by the linear actuator.

10. The cordless drill having rotating magazine for bits according to claim 9
   wherein the linear actuator pushes the first bit forward out of the top chamber to a bit extended position where the drill chuck is tightened around the first bit such that rotation of the electric motor rotates the first bit and the linear actuator pulls the first bit rearward to a bit retracted position within the top chamber such that the magazine is rotated to select the second bit.

11. The cordless drill having rotating magazine for bits according to claim 10
   wherein the linear actuator is an electromechanical device that moves the individual bit forward and rearward when energized by the battery pack.

12. The cordless drill having rotating magazine for bits according to claim 11 wherein the linear actuator is a hollow cylindrical telescoping tube such that the individual bit located within the linear actuator is moved by the linear actuator.

13. The cordless drill having rotating magazine for bits according to claim 11
   wherein the linear actuator is energized by the battery pack via a bit control button;
   wherein the bit control button is adapted to be actuated by the user in order to energize the linear actuator to deploy or retract the individual bit located in the top chamber.

14. The cordless drill having rotating magazine for bits according to claim 13
   wherein the mechanical drive bypass transfers the rotational motion of the motor shaft to the drill chuck using a mechanical drivetrain that avoids mechanical interference with the magazine;
   wherein the mechanical drive bypass comprises a bypass shaft, a first gearset, and a second gearset.

15. The cordless drill having rotating magazine for bits according to claim 14
   wherein the bypass shaft is oriented to front-to-rear and parallel to the magazine;
   wherein the first gearset rotationally couples the electric motor to the bypass shaft such that the bypass shaft rotates whenever the electric motor rotates;

wherein the second gearset rotationally couples the bypass shaft to the drill chuck such that the individual bit held by the drill chuck rotates whenever the bypass shaft rotates.

16. The cordless drill having rotating magazine for bits according to claim 15
   wherein the motor shaft is perpendicular to the bypass shaft and the first gearset changes the direction of the rotation by 90 degrees.

17. The cordless drill having rotating magazine for bits according to claim 15
   wherein the battery pack comprises one or more energy-storage devices;
   wherein the battery pack is a source of electrical energy to operate the electric motor and the linear actuators;
   wherein the battery pack is rechargeable and replaceable;
   wherein the battery pack detachably couples to the bottom of the handle.

18. The cordless drill having rotating magazine for bits according to claim 17
   wherein the cordless drill having rotating magazine for bits further comprises a white led light located at the front of the drill body above the drill chuck;
   wherein the white led light is configured to shine on the work that is being drilled;
   wherein the white led light is energized by the trigger switch such that the white led light is on whenever the electric motor is rotating.

* * * * *